United States Patent [19]

Winblad

[11] 4,160,616
[45] Jul. 10, 1979

[54] DRILL CONTAINING MINIMUM CUTTING MATERIAL

[76] Inventor: Michael E. Winblad, 835 N. Hyatt St., Tipp City, Ohio 45371

[21] Appl. No.: 838,802

[22] Filed: Oct. 3, 1977

[51] Int. Cl.² .............................................. B23B 51/00
[52] U.S. Cl. ..................................... 408/144; 408/229
[58] Field of Search ............... 408/199, 200, 226, 227, 408/228, 229, 144, 713, 705, 59

[56] References Cited
U.S. PATENT DOCUMENTS

| | | | |
|---|---|---|---|
| 2,418,021 | 3/1947 | Fleischer | 408/144 X |
| 2,817,983 | 12/1957 | Mossberg | 408/144 X |
| 3,010,345 | 11/1961 | Wagner | 408/229 X |

Primary Examiner—Gil Weidenfeld
Attorney, Agent, or Firm—Jacox & Meckstroth

[57] ABSTRACT

A drill containing a minimum volume of cutting material. A cutting element and support pads which comprise very hard material are of minimum physical size and are inserted into a shank of tool steel or the like to provide a minimum volume of costly cutting material, while maintaining the necessary shank for supporting and rotating the cutting element and support pads. The cutting element has a plurality of surfaces to provide a small cutting web, each surface being in alignment with another surface to provide continuity in forming surfaces.

7 Claims, 5 Drawing Figures

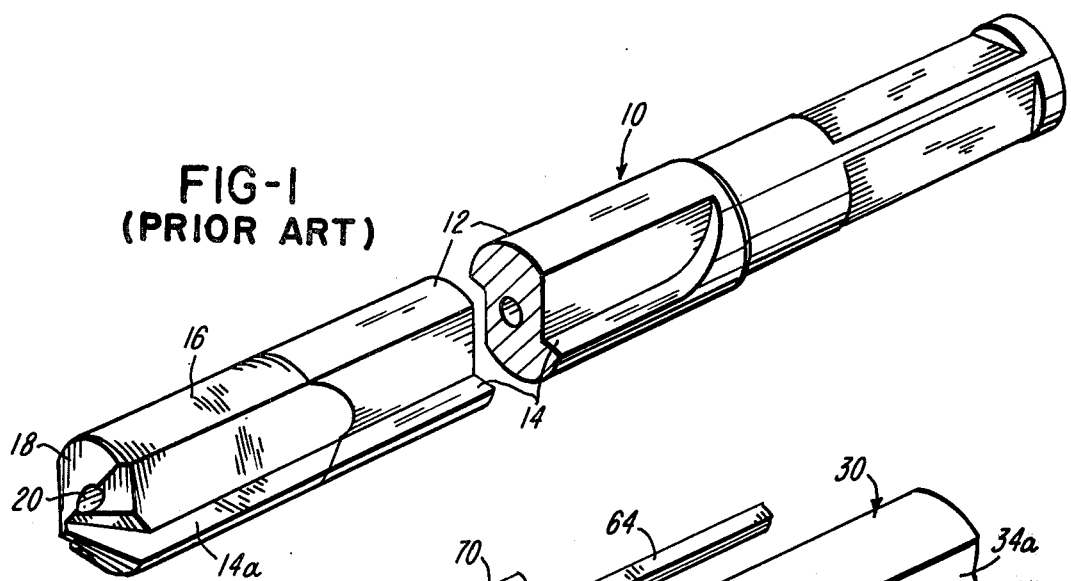
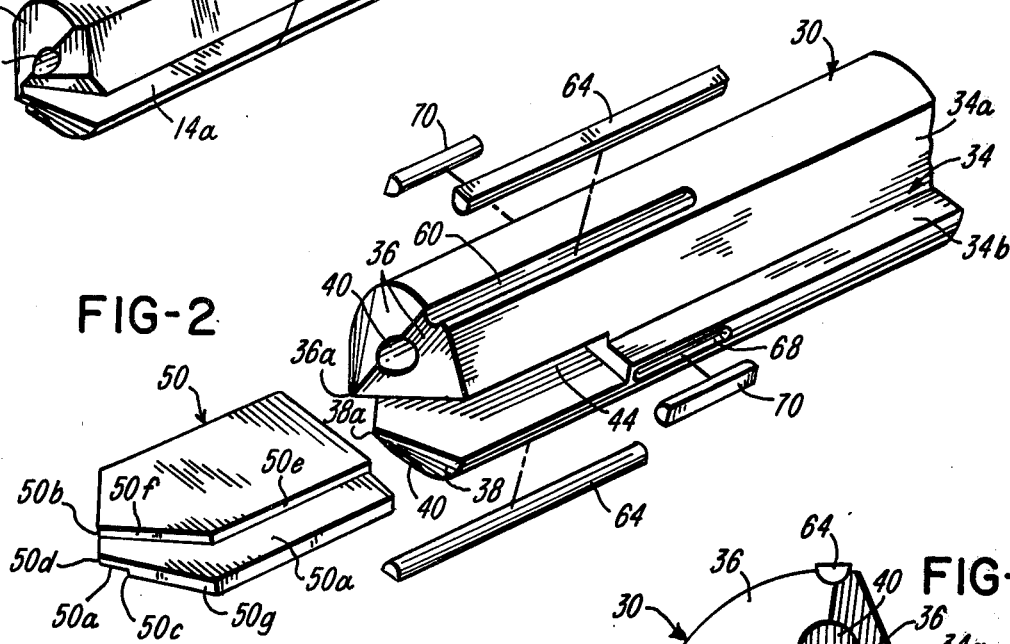
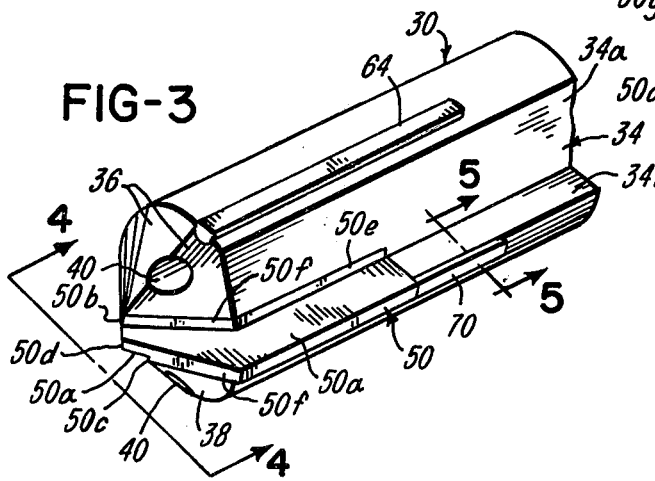
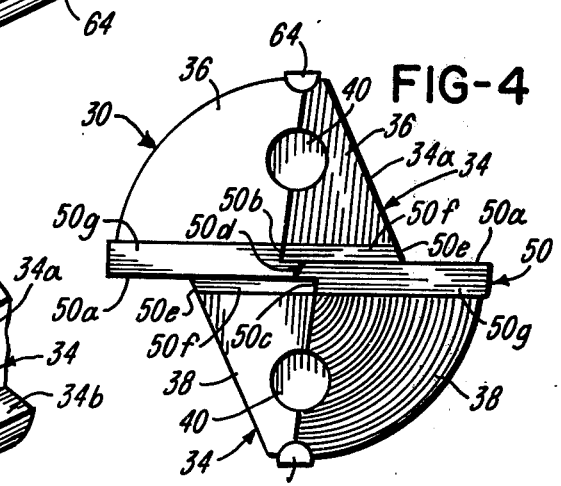
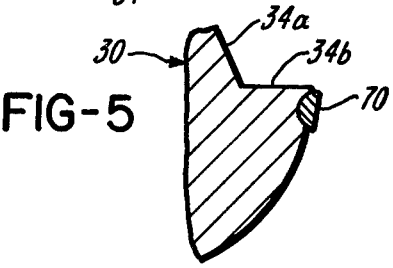

DRILL CONTAINING MINIMUM CUTTING MATERIAL

BACKGROUND OF THE INVENTION

Cutting material used in a drill member is conventionally tungsten-carbide or the like which has a hardness which is considerably greater than the hardness of tool steel. Therefore, the tungsten-carbide material is excellent cutting material. However, the tungsten-carbide material is very costly compared to the cost of tool steel material.

In the past, efforts have been made to reduce the volume of costly tungsten-carbide material or the like used in a drill. A shank of tool steel is conventionally used to support at the end thereof an elongate generally cylindrical body of tungsten-carbide material, which is brazed to the end of the shank. There have been other attempts to reduce the volume of costly cutting material at the end of a drill shank. However, in all of these attempts the volume of the costly cutting material has been greater than necessary for proper functioning of the drill, or the cutting material provided at the end of the shank has not been properly shaped or sufficient in volume or has not been appropriately located for best functioning of a drill.

Thus, it is an object of this invention to provide a drill which contains a minimum volume of costly cutting material but which contains sufficient cutting material for proper functioning of the drill.

It is also an object of this invention to provide a drill in which a minimum cutting web is provided for best centering operation of the drill.

Other objects and advantages of this invention reside in the construction and arrangement of parts, the combination thereof, the method of manufacture, and the mode of operation as will become more apparent from the following description.

BRIEF DESCRIPTION OF THE VIEWS OF THE DRAWING

FIG. 1 is a perspective view, with parts broken away, showing a prior art drill, comprising a shank to which a generally cylindrical body of cutting material is attached to the end thereof.

FIG. 2 is a perspective exploded view of the end of a drill shank of this invention and showing the insert elements of this invention which form a drill of this invention.

FIG. 3 is a perspective view showing insert elements of FIG. 2 attached to the end of the drill shank of FIG. 2 to form a drill of this invention.

FIG. 4 is an enlarged end view taken substantially on line 4—4 of FIG. 3.

FIG. 5 is an enlarged fragmentary sectional view taken substantially on line 5—5 of FIG. 3.

DETAILED DESCRIPTION OF THE INVENTION

FIG. 1 illustrates a prior art drill 10 which comprises a shank 12, of desired length and shape. The shank 12 has elongate longitudinally extending flutes 14. The shank 12 is of tool steel or the like. The end of the shank 12 has an elongate generally cylindrical body 16 attached thereto by any suitable means, such as by brazing or the like. The elongate cylindrical body 16 comprises cutting material, such as tungsten-carbide or the like. The elongate body 16 may be molded to desired shape prior to attachment to the shank 12, or the elongate body 16 may be generally of the desired shape prior to attachment to the shank 12 and ground to desired shape after attachment to the shank 12. The elongate body 16 has flutes 14a which are in alignment with the flutes 14 of the shank 12. The elongate body 16 also has a pointed tapered end portion 18 which is shaped as desired. The elongate body 16 is also shown as having a fluid passage 20 which communicates with a fluid passage, not shown, within the shank 12 for supplying lubricant to the elongate body 16.

Material such as the tungsten-carbide material of the elongate body 16 is necessary for drilling of hard materials. However, the tungsten-carbide material is very expensive in comparison to the cost of the tool steel of which the shank 12 is composed. Thus, the cost of the drill 10 having the elongate body 16 is much less than the cost of a drill which is composed entirely of tungsten-carbide material or the like.

FIG. 2 illustrates a drill of this invention in which substantially less volume of costly cutting material is used than in the prior art drill of FIG. 1. FIG. 2 shows a drill shank 30 which is provided with longitudinally extending flutes 34. Each flute 34 has an inclined wall surface 34a and a radially extending wall surface 34b. The end of the shank 30 has a spaced-apart tapered portions 36 and 38. Each of the tapered portions 36 and 38 has a longitudinally extending fluid passage 40 therein for flow of lubricant from the shank 30. The tapered portions 36 and 38 are separated by a transversely and longitudinally extending channel 44. The tapered portion 36 has a point 36a and the tapered portion 38 has a point 38a.

A substantially flat cutting element 50 is formed by a process such as by molding or the like and is adapted to be positioned within the channel 44. The cutting element 50 is made of cutting material such as tungsten-carbide or the like. The cutting element 50 is provided with a pair of surfaces 50a, each of which is in longitudinal alignment with one of the surfaces 34b of the flutes 34.

The cutting element 50 also has a sloping cutting edge 50b which is in alignment with the point 36a of the tapered portion 36. The cutting element 50 also has a sloping cutting edge 50c which is in alignment with the point 38a of the tapered portion 38. The cutting element 50 also has a cutting edge or cutting web 50d which is between the surfaces 50a. The cutting edge 50d forms a thin web which serves as the center for drilling as the shank 30 is rotated. The cutting element 50 also has a pair of short inclined longitudinally extending surfaces 50e, each of which is aligned with one of the inclined surfaces 34a. The cutting element 50 also has a pair of inclined surfaces 50f, each of which is in alignment with a part of the surface of one of the tapered portions 36 and 38. The cutting element 50 also has a pair of inclined surfaces 50g, each of which is in alignment with a part of the surface of one of the tapered portions 36 and 38.

The shank 30 has a pair of longitudinally extending grooves 60 in the surface thereof, each of which leads from one of the tapered portions 36 and 38. Each of the grooves 60 is adjacent one of the inclined surfaces 34a. An elongate support pad 64 is positioned within each of the grooves 60. The shank 30 also has a pair of longitudinally extending grooves 68 which are positioned adjacent the channel 44 and in longitudinal alignment therewith. An elongate support pad 70 is positioned within each of the grooves 68 and is in alignment with the cutting element 50.

As best shown in FIG. 3, the end of the support pads 64 and the end of the support pads 70 are in substantially the same transverse plane. Thus, the effective working length of the drill is the dimension from the cutting web 50d to the ends of the support pads 64 and 70. Preferably, the support pads 64 and 70 are made of the same material as the cutting element 50. However, another very hard material may also be satisfactory.

When wear of the cutting edges 50b and 50c and wear of the tapered portions 36 and 38 occurs, the tapered portions 36 and 38 and the cutting element 50 can be ground back to the desired angles.

Thus, a drill of this invention contains a minimum volume of costly cutting material while providing all of the necessary cutting capability of a drill and while also providing all of the necessary regrind capability of a drill.

Although the preferred embodiment of the drill of this invention has been described, it will be understood that within the purview of this invention various changes may be made in the form, details, proportion and arrangement of parts, the combination thereof, and the mode of operation, which generally stated consist in a drill within the scope of the appended claims.

The invention having thus been described, the following is claimed:

1. A drill of the type having an elongate shank of tool steel material and having a maximum diameter dimension, the shank having a tip part provided with a pair of spaced-apart tapered portions, the improvement comprising a cutting element of cutting material having a hardness greater than said tool steel material and positioned between the tapered portions and attached to the shank, the cutting element having at least four parallel transversely extending surfaces within a total transverse dimension, each of these surfaces having a transverse dimension substantially equal to one-half the maximum diameter dimension of the shank, there being a pair of opposed parallel surfaces which are spaced-apart by a given dimension, the cutting element also having a pair of intermediate opposed parallel surfaces which are spaced-apart less than the given dimension to form a cutting web which has a dimension less than the given dimension each of the transversely extending surfaces having a transverse dimension substantially less than the total transverse dimension of the cutting element.

2. The drill of claim 1 which includes a plurality of support pads attached to the shank in axial alignment with the cutting element and spaced from the tapered portions of the shank.

3. A drill having a minimum volume of cutting material and being of the type having a shank of a material having a given hardness and provided with a plurality of longitudinally extending flutes, each flute having a radial extending wall surface and an angular wall surface which is angular with respect to the radius of the shank, the shank having two spaced-apart tapered tip portions, each tapered tip portion having a surface terminating in a point, the improvement comprising:

a cutting element of cutting material having a hardness greater than said given hardness and, positioned between the two spaced-apart tapered tip portions of the shank and having two tip parts, each tip part of the cutting element being closely adjacent the point of one of the tapered tip portions of the shank so that each tip part of the cutting element is a smooth continuation of one of the tapered tip portions of the shank, the cutting element also having two axially and transversely extending surfaces, each axially and transversely extending surface having a portion in axial alignment with one of the radially extending wall surfaces of a flute of the shank, the cutting element also having two angular axially extending surfaces, each angular axially extending surface being in alignment with one of the angular wall surfaces of a flute of the shank, there thus being a smooth transition between the cutting element and the shank.

4. The drill of claim 3 in which the cutting element is substantially flat and having a given thickness dimension, the drill also including a pair of support pads, each of the support pads being carried by the shank in longitudinal alignment with the cutting element and having a dimension substantially equal to said given thickness dimension of the cutting element.

5. The drill of claim 3 in which the cutting element has a plurality of inclined surfaces, each of the inclined surfaces being in alignment with a part of the surface of one of the tapered tip portions.

6. A drill having a minimum volume of cutting material and being of the type having a shank of a material having a given hardness and provided with a maximum diameter dimension and provided with a flute having an axially extending surface, the flute having a radially extending wall surface and an angular wall surface which is angular with respect to the radially extending wall surface, the shank having a pair of spaced-apart tapered tip portions, each of the tapered tip portions having a surface which terminates in a point, the improvement comprising:

a flat cutting element of cutting material having a hardness greater than said given hardness and, positioned between the spaced-apart tapered tip portions of the shank, the cutting element having a transverse dimension substantially equal to the maximum diameter dimension of the shank, the cutting element having a pointed tip part closely adjacent the point of one of the tapered tip portions, the cutting element having a pair of main parallel transverse surfaces spaced-apart by a given major thickness dimension, the cutting element also having a pair of intermediate parallel surfaces between the main parallel surfaces and providing a cutting web therebetween, the cutting web having a pair of minor surfaces forming a minor thickness dimension less than the given major thickness dimension, the minor thickness dimension of the cutting element forming an axially extending surface which is in axial alignment with the axially extending surface of the flute of the shank, the cutting element also having an angular surface between one of the main transverse surfaces and one of the minor surfaces, the angular surface being in alignment with the angular wall surface of the flute, the cutting element also having a plurality of inclined surfaces, each of the inclined surfaces being adjacent and in alignment with a part of the surface of one of the tapered tip portions of the shank, there thus being a smooth transition between the shank and the cutting element.

7. A drill having a mimimum volume of cutting material and being of the type having a shank of a material having a given hardness and provided with a maximum transverse dimension and a lesser transverse dimension, the shank having a pair of spaced-apart tapered tip portions, each of the tapered tip portions having a surface which terminates in a point, the improvement comprising:

a substantially flat cutting element of cutting material having a hardness greater than said given hardness and positioned between the spaced-apart tip portions, the cutting element having a total transverse dimension substantially equal to the maximum transverse dimension of the shank, the cutting element having a plurality of transverse portions each of which has a transverse dimension substantially equal to the lesser transverse dimension of the shank, each of the transverse portions having a surface in alignment with a surface of the flute of the shank, each of the transverse portions having a tip part substantially at the transverse center thereof and closely adjacent the point of one of the tapered tip portions of the shank, there thus being a smooth transition between the shank and the cutting element, the transverse portions of the cutting element forming a cutting web therebetween at a location substantially at the transverse center of the cutting element.

* * * * *